US006823676B2

(12) United States Patent
Conete et al.

(10) Patent No.: US 6,823,676 B2
(45) Date of Patent: Nov. 30, 2004

(54) MOUNTING FOR A CMC COMBUSTION CHAMBER OF A TURBOMACHINE BY MEANS OF FLEXIBLE CONNECTING SLEEVES

(75) Inventors: Eric Conete, Merignac (FR); Alexandre Forestier, Boissise-la-Bertrand (FR); Didier Hernandez, Quiers (FR)

(73) Assignee: SNECMA Moteurs, Paris (FR)

(*) Notice: Subject to any disclaimer, the term of this patent is extended or adjusted under 35 U.S.C. 154(b) by 0 days.

(21) Appl. No.: 10/161,805

(22) Filed: Jun. 5, 2002

(65) Prior Publication Data

US 2003/0000223 A1 Jan. 2, 2003

(30) Foreign Application Priority Data

Jun. 6, 2001 (FR) ........................................... 01 07375

(51) Int. Cl.[7] ................................................ F02C 7/20
(52) U.S. Cl. .......................................... 60/796; 60/800
(58) Field of Search ......................... 60/753, 796, 798, 60/800

(56) References Cited

U.S. PATENT DOCUMENTS

| | | | | | |
|---|---|---|---|---|---|
| 2,268,464 | A | * | 12/1941 | Seippel | 60/800 |
| 2,510,645 | A | * | 6/1950 | McMahan | 60/796 |
| 4,688,378 | A | * | 8/1987 | Harris | 60/800 |
| 4,821,522 | A | | 4/1989 | Matthews et al. | |
| 5,363,643 | A | * | 11/1994 | Halila | 60/796 |
| 5,524,430 | A | * | 6/1996 | Mazeaud et al. | 60/798 |
| 5,701,733 | A | | 12/1997 | Lewis et al. | |
| 5,813,832 | A | | 9/1998 | Rasch et al. | |
| 6,131,384 | A | | 10/2000 | Ebel | |
| 6,182,451 | B1 | * | 2/2001 | Hadder | 60/753 |
| 6,334,298 | B1 | * | 1/2002 | Aicholtz | 60/796 |
| 6,497,104 | B1 | * | 12/2002 | Thompson et al. | 60/796 |

FOREIGN PATENT DOCUMENTS

| | | |
|---|---|---|
| DE | 37 31 901 | 4/1989 |
| GB | 1 570 875 | 7/1980 |

* cited by examiner

*Primary Examiner*—Michael Koczo
(74) *Attorney, Agent, or Firm*—Oblon, Spivak, McClelland, Maier & Neustadt, P.C.

(57) ABSTRACT

In a turbomachine comprising a metal material shell containing in a gas flow direction F: a fuel injection assembly; a composite material combustion chamber; and a metal material sectorized nozzle forming the inlet stage with fixed blades of a high pressure turbine, provision is made for the combustion chamber to be held by a sectorized flexible sleeve of metal material having one end fixed to the combustion chamber by first fixing means and a flange-forming opposite end fixed to the shell by second fixing means. The first fixing means also serve to connect the combustion chamber to the sectorized nozzle.

12 Claims, 2 Drawing Sheets

MOUNTING FOR A CMC COMBUSTION CHAMBER OF A TURBOMACHINE BY MEANS OF FLEXIBLE CONNECTING SLEEVES

FIELD OF THE INVENTION

The present invention relates to the field of turbomachines, and more particularly it relates to the interface between the high pressure turbine and the combustion chamber in turbojets having a combustion chamber that is made of ceramic matrix composite (CMC) material.

PRIOR ART

Conventionally, in a turbomachine, the high pressure turbine (HPT) and in particular its inlet nozzle, the combustion chamber, and also the casing (or "shell") for said chamber are all made of metal type materials. However, under certain particular conditions of use involving very high combustion temperatures, the use of a metal combustion chamber turns out to be completely unsuitable from a thermal point of view and it is necessary to make use of a combustion chamber based on high temperature composite materials of the CMC type. However the difficulties involved in working such materials and their raw material costs mean that their use is usually restricted to the combustion chamber itself, with the high pressure turbine inlet nozzle and the casing continuing to be made more conventionally out of metal materials. Unfortunately, metal materials and composite materials have coefficients of thermal expansion that are very different. As a result, aerodynamic problems that are particularly severe arise at the interface with the nozzle at the inlet to the high temperature turbine, and in the connection between the casing and the chamber.

OBJECT AND BRIEF SUMMARY OF THE INVENTION

The present invention mitigates those drawbacks by proposing a casing-to-chamber connection having the ability to absorb the displacements induced by the differences between the expansion coefficients of those parts. Another object of the invention is to propose a structure that is simple in shape and that is particularly easy to manufacture.

These objects are achieved by a turbomachine comprising a shell of metal material containing, in a gas flow direction F: a fuel injection assembly; a composite material combustion chamber; and a sectorized nozzle of metal material forming the inlet stage with fixed blades of a high pressure turbine, wherein said combustion chamber is held in position by a sectorized flexible sleeve of metal material having a first end fixed by first fixing means to said combustion chamber and having a flange-forming second end fixed to said shell by second fixing means. Said first fixing means also serve to connect said combustion chamber to said sectorized nozzle.

By means of this direct attachment (integration) of the combustion chamber to the nozzle, any misalignment of the stream of gas in operation is avoided (thus guaranteeing better feed to the high pressure turbine), while also improving sealing between the combustion chamber and the nozzle. The connection to the shell via a system of sectorized flexible sleeves also provides an appreciable saving in weight for the combustion chamber compared with traditional connection devices having heavy rigid flanges.

The first fixing means are preferably constituted by a plurality of bolts. The flexible sectorized metal sleeve has ventilation orifices to allow a cooling fluid to pass through and a plurality of parallel sectorization slots terminating at the upstream ends of said ventilation orifices. The sectorization slots are dimensioned to compensate for the relative thermal expansion that exists between the combustion chamber made of composite material and the shell made of metal material.

In a preferred embodiment in which the turbomachine comprises a shell having outer and inner annular walls of metal material defining between them a space for receiving in succession, in the gas flow direction F: a fuel injection assembly, and both an annular combustion chamber of composite material formed by an outer axially-extending side wall, an inner axially-extending side wall, and a transversely-extending end wall, and also by a sectorized annular nozzle of metal material formed by a plurality of fixed blades mounted between an outer sectorized circular platform and an inner sectorized circular platform, provision is made for the downstream ends of said outer and inner side walls of the combustion chamber to be held in position by outer and inner flexible sleeves of metal material having first ends fixed to said outer and inner downstream ends by first fixing means, and having flange-forming second ends fixed to said outer and inner annular shells by second fixing means.

Advantageously, these first fixing means comprise both first holding means for holding said downstream end portion of the inner side wall of the combustion chamber between said inner sectorized circular platform of the nozzle and said first end of the inner sectorized flexible sleeve, and also second holding means for holding said downstream end portion of the outer side wall of the combustion chamber between said outer sectorized circular platform of the nozzle and said first end of the outer sectorized flexible sleeve.

Preferably, said first end of the inner sectorized flexible sleeve has a flange-forming downstream portion that serves as a bearing surface for a gasket of the inner annular wall of the shell.

In order to provide sealing in the turbomachine, said inner annular wall of the shell has a flange including a circular groove suitable for receiving a circular gasket of the omega type for providing sealing between said flange and the inner annular wall of the shell and said flange-forming downstream portion.

BRIEF DESCRIPTION OF THE DRAWINGS

The characteristics and advantages of the present invention appear more fully from the following description made by way of non-limiting indication and with reference to the accompanying drawings, in which.

DETAILED DESCRIPTION OF A PREFERRED EMBODIMENT

Figure 1:
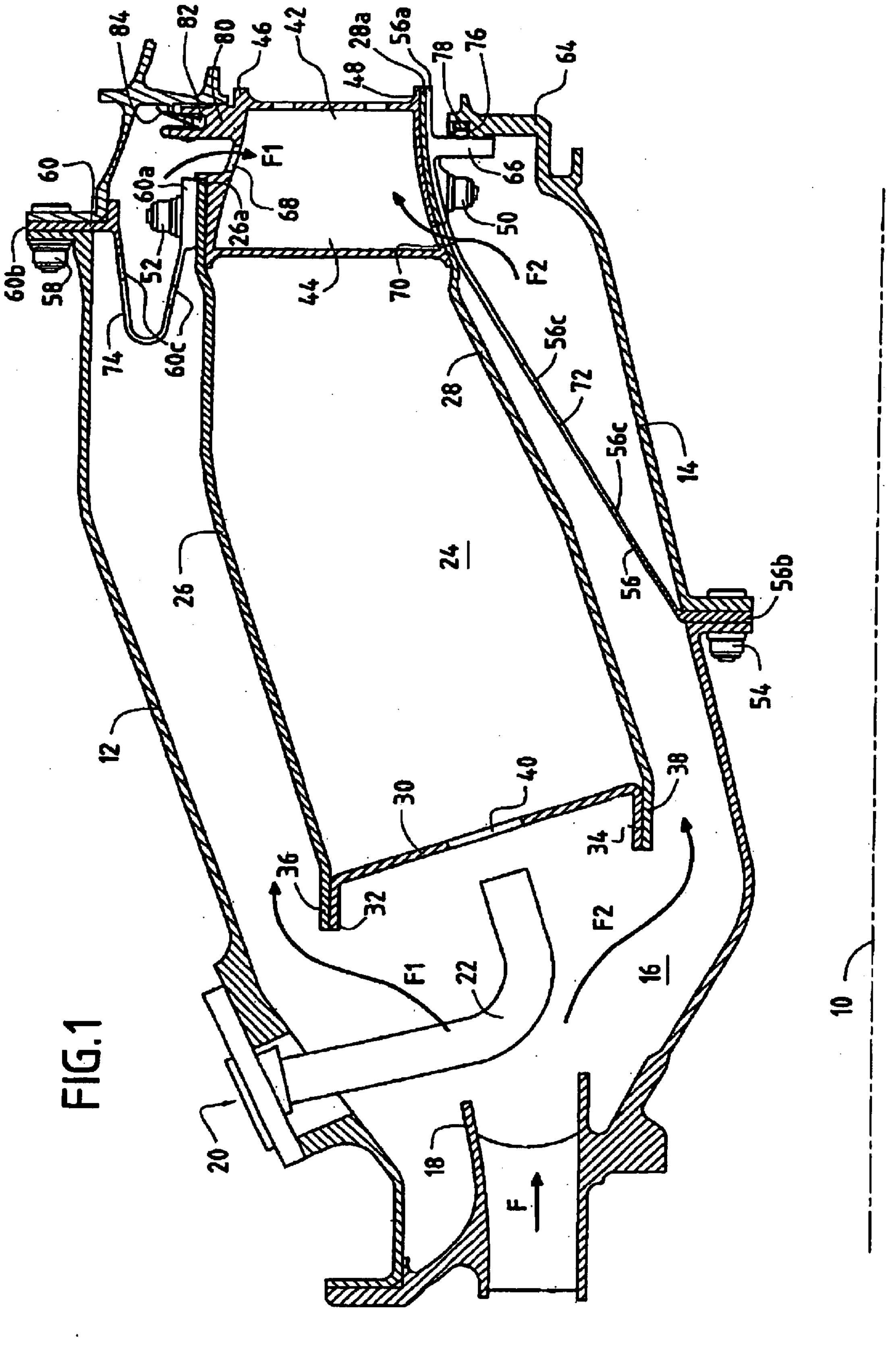
FIG. 1 is an axial half-section of the central portion of a turbomachine.
Figure 2:
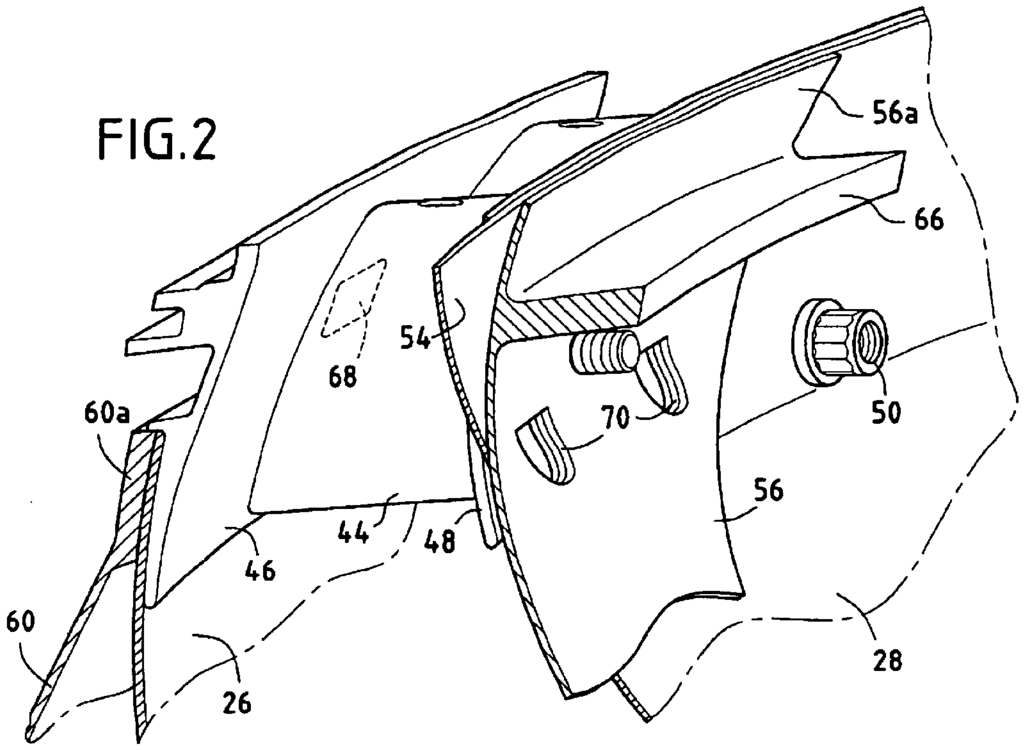
FIG. 2 is a detailed perspective view of the connection between the high pressure turbine and the combustion chamber at the inner platform of the nozzle.

FIG. 1 is an axial half-section of the central portion of a turbojet or a turboprop (referred to generically as a "turbomachine" in the description below), comprising:

a shell having an outer annular wall (or case) 12 of metal material about a longitudinal axis 10 and an inner annular wall (or case) 14 that is coaxial therewith and likewise made of metal material; and an annular space 16 extending between the two annular walls 12, 14 of said shell and receiving the compressed oxidizer, generally air, coming from an upstream compressor (not shown) of the turbomachine via an annular diffusion duct 18 defining a general gas flow direction F.

In the gas flow direction, this space 16 contains firstly an injection assembly made up of a plurality of injection systems 20 regularly distributed around the duct 18 and each comprising a fuel injection nozzle 22 fixed to the outer annular shell 12 (in order to simplify the drawings, the mixer and the deflector associated with each injection nozzle are omitted), followed by a combustion chamber 24 of high temperature composite material of the CMC type or the like (e.g. carbon), formed by an outer axially-extending side wall 26 and an inner axially-extending side wall 28 both coaxial about the axis 10 and by a transversely-extending end wall 30 having margins 32, 34 fixed by any suitable means, e.g. flat-headed metal or refractory bolts, to the upstream ends 36, 38 of the side walls 26, 28, said end wall 30 being provided with orifices 40 in particular to enable fuel and a portion of the oxidizer to be injected into the combustion chamber 24, and finally an annular nozzle 42 of metal material forming an inlet stage for a high pressure turbine (not shown) and conventionally comprising a plurality of fixed blades 44 mounted between an outer sectorized circular platform 46 and an inner sectorized circular platform 48.

In the invention, the combustion chamber 26, 28 is held in position by a flexible sleeve 56, 60 of metal material having a first end 56*a*, 60*a* fixed to a downstream end 26*a*, 28*a* of the side wall of the combustion chamber by first fixing means 50, 52, and a flange-forming second end 56*b*, 60*b* fixed to the shell 12, 14 by second fixing means 54, 58. This flexible sleeve is partially sectorized to compensate for expansion differences between the CMC chamber and the metal shell. The first fixing means 50, 52 also serve to hold the nozzle 42 between the side walls 26, 28 of the chamber. Thus, the downstream end 26*a* of the outer side wall of the combustion chamber is mounted between the outer platform 46 of the nozzle and the first end 60*a* of the outer sectorized flexible sleeve of metal material whose flange-forming second end 60*b* is fixed to the outer annular shell 12 so that the assembly made up of these three elements: the downstream end of the outer axial wall; the outer platform of the nozzle; and the first end of the outer sectorized flexible sleeve being held clamped together by the first fixing means. Similarly, the downstream end 28*a* of the inner side wall of the combustion chamber is mounted between the inner platform 48 of the nozzle and the first end 56*a* of the inner sectorized flexible sleeve of metal material whose flange-forming second end 56*b* is fixed to the inner annular shell 14, with the assembly formed by these three elements: the downstream end of the inner axial wall; the inner platform of the nozzle; and the first end of the inner sectorized flexible sleeve being held clamped together by the first fixing means.

These first fixing means comprise firstly first holding means 50 for holding the downstream end 28 of the inner side wall 28 of the combustion chamber (i.e. remote from its upstream end 38) pinched between the inner sectorized circular platform 48 of the nozzle and the first end 56*a* of the inner metal sectorized flexible sleeve 56, and secondly second holding means 52 which hold the downstream end 26*a* of the outer side wall of the combustion chamber (i.e. remote from the upstream end 36) pinched between the outer sectorized circular platform 46 of the nozzle and the first end 60*a* of the outer metal sectorized flexible sleeve 60.

Similarly, the second fixing means comprise firstly first connection means 54 for fixing the upstream flange 56*b* of the inner sectorized flexible sleeve to the inner annular shell 14, and secondly second connection means 58 for fixing the upstream flange 60*b* of the outer sectorized flexible sleeve to the outer annular shell 12.

The first and second holding means 50, 52 and the first and second connection means 54, 58 are advantageously constituted by respective pluralities of bolts.

The first end 56*a* of the inner metal flexible sleeve 56 is advantageously provided with a flange-forming downstream portion 66 serving as a bearing surface for a gasket mounted in a flange 64 of said inner annular shell.

Figure 3:
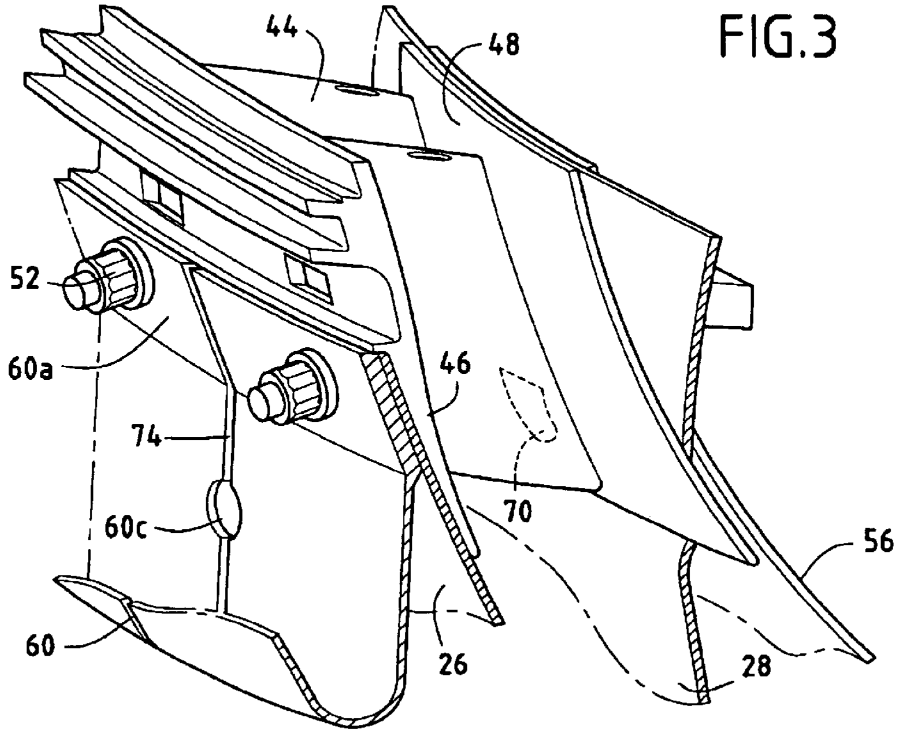
FIG. 3 is a detailed perspective view showing the connection between the high pressure turbine and the combustion chamber at the outer platform of the nozzle.

Through orifices 68, 70 formed in the outer and inner metal platforms 46 and 48 of the nozzle 42 are also provided to enable the fixed blades 44 of the nozzle to be cooled at the inlet to the high pressure turbine rotor by using compressed oxidizer that is available at the outlet from the diffusion duct 18 and that flows in two streams F1 and F2 on either side of the combustion chamber. These cooling streams are initially passed between the various sectors of the inner and outer metal sectorized flexible sleeves, and they are also passed via ventilation orifices 56*c*, 60*c* formed through these sleeves in the slots 72, 74 separating adjacent sectors (see for example FIG. 3). These sectorizing slots are dimensioned in a manner that is determined to compensate for the thermal expansion that exists between the composite material combustion chamber and the metal material shell.

In order to seal the gas streams flowing between the combustion chamber and the inlet nozzle to the turbine, the flange 64 of the inner annular shell has a circular groove 76 for receiving an omega type circular gasket 78 that provides sealing between said flange of the inner annular shell and the flange-forming downstream end 66 of the inner metal sleeve 56. Thus, the compressed oxidizer flow coming from the compressor and going past the chamber via F2 can penetrate into the turbine only by passing through the orifices 70 (after passing through the sectorizing slots 72 and the ventilation orifices 56*c*). Similarly, the outer circular platform 46 of the nozzle has a flange 80 provided with a circular groove 82 for receiving a spring-blade gasket 84 having one end that comes into contact with the outer annular shell 12 to provide sealing for the stream F1 which is thus forced to flow through the orifices 68 (also after passing through the sectorizing slots 74 and the ventilation orifices 60*c*).

What is claimed is:

1. A turbomachine comprising a shell of metal material comprising, in a gas flow direction F: a fuel injection assembly; a composite material combustion chamber; and a nozzle of metal material forming the inlet stage with fixed blades of a high pressure turbine, wherein said combustion chamber is held in position by a sectorized flexible sleeve of metal material having a first end fixed by first fixing means to said combustion chamber and having a flange-forming second end fixed to said shell by second fixing means, and said first fixing means also provide connection between said combustion chamber and said nozzle.

2. A turbomachine according to claim 1, wherein said first fixing means are constituted by a plurality of bolts.

3. A turbomachine according to claim 1, wherein said metal sectorized flexible sleeve has ventilation orifices for allowing a cooling fluid to pass through.

4. A turbomachine according to claim 3 wherein said metal sectorized flexible sleeve has a plurality of parallel sectorizing slots terminating at the upstream ends of said ventilation orifices.

5. A turbomachine according to claim 4, wherein said sectorizing slots are dimensioned to compensate for the thermal expansion that exists between the combustion chamber of composite material and the shell of metal material.

6. The turbomachine of claim 1, wherein said nozzle of metal material is sectorized.

7. A turbomachine comprising a shell having outer and inner annular walls of metal material defining between them a space for receiving in succession, in the gas flow direction F: a fuel injection assembly, an annular combustion chamber of composite material formed by an outer axially-extending side wall, an inner axially-extending side wall, and a transversely-extending end wall, and an annular nozzle of metal material formed by a plurality of fixed blades mounted between an outer circular platform and an inner circular platform, wherein downstream ends of said outer and inner side walls of the combustion chamber are held in position by outer and inner sectorized flexible sleeves of metal material having first ends fixed to said outer and inner downstream ends by first fixing means and having flange-forming second ends fixed to said outer and inner annular shells by second fixing means, and said first end of the inner sectorized flexible sleeve has a flange-forming downstream portion serving as a bearing surface for a gasket of said inner annular wall of the shell.

8. A turbomachine according to claim 7, wherein said first fixing means comprise firstly first holding means for holding said downstream end of the inner side wall of the combustion chamber between said inner circular platform of the nozzle and said first end of the inner sectorized flexible sleeve, and secondly second holding means for holding said downstream end of the outer side wall of the combustion chamber between said outer circular platform of the nozzle and said first end of the outer sectorized flexible sleeve.

9. A turbomachine according to claim 8, wherein each of said first and second holding means is constituted by a respective plurality of bolts.

10. A turbomachine according to claim 7, wherein said inner annular wall of the shell includes a flange having a circular groove receiving an omega type circular gasket for providing sealing between said flange of the inner annular wall of the shell and said flange-forming downstream portion.

11. The turbomachine of claim 7, wherein said annular nozzle of metal and said outer and inner circular platforms are sectorized.

12. A turbomachine, comprising:

a metallic shell having, in a general flow direction, a fuel injection assembly, a composite material combustion chamber, and a metallic turbine inlet guide vane assembly; and a flexible metallic sleeve configured to hold said composite material combustion chamber to said metallic turbine inlet guide vane assembly and to said metallic shell, said sleeve having at least a flange and a plurality of slots extending an entire axial length of a portion of said sleeve in a direction along said flow direction.

* * * * *